United States Patent
Rao et al.

(10) Patent No.: US 10,781,723 B2
(45) Date of Patent: Sep. 22, 2020

(54) METHODS AND APPARATUS TO OPTIMIZE STEAM HEADER BLENDING AND GAS TURBINE LOADING IN COMBINED CYCLE POWER PLANTS

(71) Applicant: Emerson Process Management Power and Water Solutions, Inc., Pittsburgh, PA (US)

(72) Inventors: Ranjit Ramesh Rao, Gibsonia, PA (US); Xu Cheng, Pittsburgh, PA (US); Frederick Charles Huff, Pittsburgh, PA (US); Jacob Nathaniel Adams, Zanesville, OH (US)

(73) Assignee: Emerson Process Management Power and Water Solutions, Inc., Pittsburgh, PA (US)

( * ) Notice: Subject to any disclaimer, the term of this patent is extended or adjusted under 35 U.S.C. 154(b) by 724 days.

(21) Appl. No.: 15/210,439

(22) Filed: Jul. 14, 2016

(65) Prior Publication Data
US 2017/0022846 A1    Jan. 26, 2017

Related U.S. Application Data

(60) Provisional application No. 62/196,714, filed on Jul. 24, 2015.

(51) Int. Cl.
*F01K 23/10* (2006.01)
*F01K 15/00* (2006.01)
(Continued)

(52) U.S. Cl.
CPC ............ *F01K 23/101* (2013.01); *F01K 15/00* (2013.01); *F02C 6/18* (2013.01); *H02K 7/1823* (2013.01); *F05D 2270/44* (2013.01); *Y02E 20/16* (2013.01)

(58) Field of Classification Search
CPC .......... F01K 15/00; F01K 23/101; F02C 6/18; F05D 2270/44; H02K 7/1823; Y02E 20/16
See application file for complete search history.

(56) References Cited

U.S. PATENT DOCUMENTS

| | | | |
|---|---|---|---|
| 4,215,552 A | 8/1980 | Riollet et al. | |
| 4,558,227 A | 12/1985 | Yanada et al. | |

(Continued)

FOREIGN PATENT DOCUMENTS

| | | |
|---|---|---|
| CN | 102536362 | 7/2012 |
| CN | 103917928 | 7/2014 |

(Continued)

OTHER PUBLICATIONS

United States Patent and Trademark Office, "Non-Final Office action," issued in connection with U.S. Appl. No. 14/789,021, dated Apr. 25, 2018, 29 pages.

(Continued)

*Primary Examiner* — Jesse S Bogue
(74) *Attorney, Agent, or Firm* — Hanley, Flight & Zimmerman, LLC

(57) ABSTRACT

Methods and apparatus to optimize ramp rates in combined cycle power plants are disclosed herein. An example method disclosed herein includes predicting a first setpoint for a gas turbine in a combined cycle power plant over a prediction horizon and predicting a second setpoint for a steam generator over the prediction horizon. The example method includes identifying a first steam property of steam generated by the steam generator in the combined cycle power plant based on the second setpoint. The example method includes comparing the first steam property to a second steam property of steam associated with a steam turbine in the combined cycle power plant and dynamically adjusting (Continued)

at least one of the first setpoint or the second setpoint based on the comparison.

14 Claims, 4 Drawing Sheets

(51) Int. Cl.
*H02K 7/18* (2006.01)
*F02C 6/18* (2006.01)

(56) References Cited

U.S. PATENT DOCUMENTS

| | | | | |
|---|---|---|---|---|
| 4,578,944 | A * | 4/1986 | Martens | F01K 23/105 |
| | | | | 122/7 B |
| 7,980,053 | B2 | 7/2011 | Yakushi et al. | |
| 8,560,283 | B2 | 10/2013 | Cheng et al. | |
| 9,074,493 | B2 * | 7/2015 | Wad | F01K 7/22 |
| 9,945,264 | B2 * | 4/2018 | Wichmann | F01K 23/101 |
| 10,167,743 | B2 * | 1/2019 | Olia | F01K 23/10 |
| 10,267,182 | B2 | 4/2019 | Cheng et al. | |
| 2007/0055392 | A1 * | 3/2007 | D'Amato | G05B 13/048 |
| | | | | 700/44 |
| 2009/0292436 | A1 | 11/2009 | D'Amato et al. | |
| 2010/0305768 | A1 | 12/2010 | Holt et al. | |
| 2012/0040298 | A1 * | 2/2012 | Beveridge | F22G 5/12 |
| | | | | 432/13 |
| 2012/0040299 | A1 * | 2/2012 | Beveridge | F01K 13/02 |
| | | | | 432/13 |
| 2012/0131917 | A1 | 5/2012 | Piccirillo et al. | |
| 2013/0110298 | A1 * | 5/2013 | Beveridge | F01K 13/02 |
| | | | | 700/287 |
| 2014/0260288 | A1 | 9/2014 | D'Amato et al. | |
| 2015/0185716 | A1 * | 7/2015 | Wichmann | F01K 23/101 |
| | | | | 700/287 |
| 2016/0230699 | A1 * | 8/2016 | Bartlett | G05B 13/04 |
| 2017/0002692 | A1 | 1/2017 | Cheng et al. | |
| 2017/0051681 | A1 * | 2/2017 | Arias Chao | F02C 9/20 |

FOREIGN PATENT DOCUMENTS

| | | |
|---|---|---|
| EP | 1707757 | 4/2006 |
| EP | 2871333 | 5/2015 |
| JP | S5444105 A | 4/1979 |
| JP | S59226211 A | 12/1984 |
| JP | S26178704 A | 8/1987 |
| JP | 09317404 | 12/1997 |

OTHER PUBLICATIONS

United States Patent and Trademark Office, "Notice of Allowance and Fee(s) Due," issued in connection with U.S. Appl. No. 14/789,021, dated Nov. 26, 2018, 16 pages.

United States Patent and Trademark Office, "Corrected Notice of Allowability," issued in connection with U.S. Appl. No. 14/789,021, dated Mar. 5, 2019, 13 pages.

Ehrsam et al. "Steam Turbine Start-up Optimization Tool based on ABAQUS and Python Scripting", 2009 SIMULIA Customer Conference (May 2009), 8 pages.

Optimize IT Brochure, "Optimize IT Predict & Control (P&C)", Italy ABB Via Hermada, 616154 Genova, Italy, copyright 2006, 4 pages.

Nakai et al., "Turbine Start-up Algorithm Based on Prediction of Rotor Thermal Stress," Proceedings of the 34th SICE Annual Conference (Jul. 1995), pp. 1561-1564, 4 pages.

Matsumura et al., "Steam Turbine Start Up Method Based on Predictive Monitoring and Control of Thermal Stress," IEE Transactions on Power Apparatus and Systems, vol. PAS-104, No. 4 (Apr. 1985), pp. 821-828, 8 pages.

Emerson Process Management, "Turbine Stress Evaluator Data Sheet," (2010), 4 pages.

"OG&E Seminole Unit 2, Rotor Stress Analysis Documentation, Rev. 1 ," (Feb. 2010), 8 pages.

Emerson Process Management, "Hot Reheat Turbine Bypass," (Jun. 15, 2003), 2 pages.

"Heat Recovery Steam Generator," available at https://www.myodesie.com/wiki/index/returnEntry/id/2994 (last accessed Jul. 20, 2015), 13 pages.

Intellectual Property Office of Great Britain, "Search Report," issued in connection with Patent Application No. GB1612494.3, dated Feb. 8, 2017, 4 pages.

Intellectual Property Office of Great Britain, "Search Report," issued in connection with Patent Application No. GB1610542.1, dated Dec. 13, 2016, 6 pages.

China National Intellectual Property Administration, "Notification of the First Office Action," issued in connection with application No. 201610509786.9, dated Jun. 3, 2019, 16 pages (includes English translation).

Chinese Patent Office, "First Office Action," issued in connection with Chinese Patent Application No. 201610585252.4, dated Aug. 5, 2019, 12 pages (inlcudes English translation).

UK Intellectual Property Office, "Examination Report under Section 18(3)," issued in connection with British Patent Application No. GB1612494.3, dated Jun. 23, 2020, 4 pages.

* cited by examiner

METHODS AND APPARATUS TO OPTIMIZE STEAM HEADER BLENDING AND GAS TURBINE LOADING IN COMBINED CYCLE POWER PLANTS

RELATED APPLICATION

This patent claims the benefit under 35 U.S.C. § 119(e) to U.S. Provisional Patent Application No. 62/196,714, filed Jul. 24, 2015, which is hereby incorporated by reference in its entirety.

FIELD OF THE DISCLOSURE

This disclosure relates generally to combined cycle power plants and, more particularly, to methods and apparatus to optimize steam header blending and gas turbine loading in combined cycle power plants.

BACKGROUND

A combined cycle power plant, such as a combined cycle gas turbine plant, includes at least one gas turbine and a steam turbine. In a combined cycle power plant, exhaust gas produced by the gas turbine is captured by a heat recovery steam generator (HRSG), which generates steam from heat energy in the exhaust gas. The steam is provided to the steam turbine, thereby providing for increased efficiency of the power plant in producing electricity through multiple thermodynamic cycles while reducing fuel costs.

Although providing the exhaust gas from the gas turbine to the steam turbine provides for an additional source of electricity, pressure and temperature of the steam provided to the steam turbine via the HRSG affect the operation of the steam turbine and conditions at the steam turbine (e.g., steam saturation). Steam from the HRSG introduced into an operating steam turbine via a steam header should substantially match the steam conditions of the operating steam turbine (e.g., as measured at the steam header) to not cause undue stress on the steam turbine by, for example, introducing steam having substantially different enthalpy values or by introducing saturated steam (e.g., occurring at conditions where steam (gas) and water (liquid) coexist) into the steam turbine, which can damage the steam turbine. For example, a pressure value of the steam generated by the HRSG should be substantially the same or within a predetermined threshold range of a pressure value of steam at the header of the steam turbine. Substantially matching the properties of the steam generated by the HRSG and the steam at the steam turbine header before introducing the HRSG steam into the steam turbine also provides for improved stabilization throughout the combined cycle power plant with respect to other HRSGs in the system. For example, if steam from one HRSG having a significantly higher pressure than a pressure of the steam at the steam turbine header is fed to the steam turbine, the other HRSGs may not be able to feed steam into the steam turbine without damaging the steam turbine. In a combined cycle power plant, steam generated by the HRSG that does not meet the pressure and/or temperature parameters for introduction into the steam turbine is bypassed or prevented from entering the steam turbine by one or more control valves. Excess bypass steam results in efficiency losses, as the bypass steam is not used by the steam turbine and, thus, is unrecovered waste heat.

SUMMARY

Figure 1:
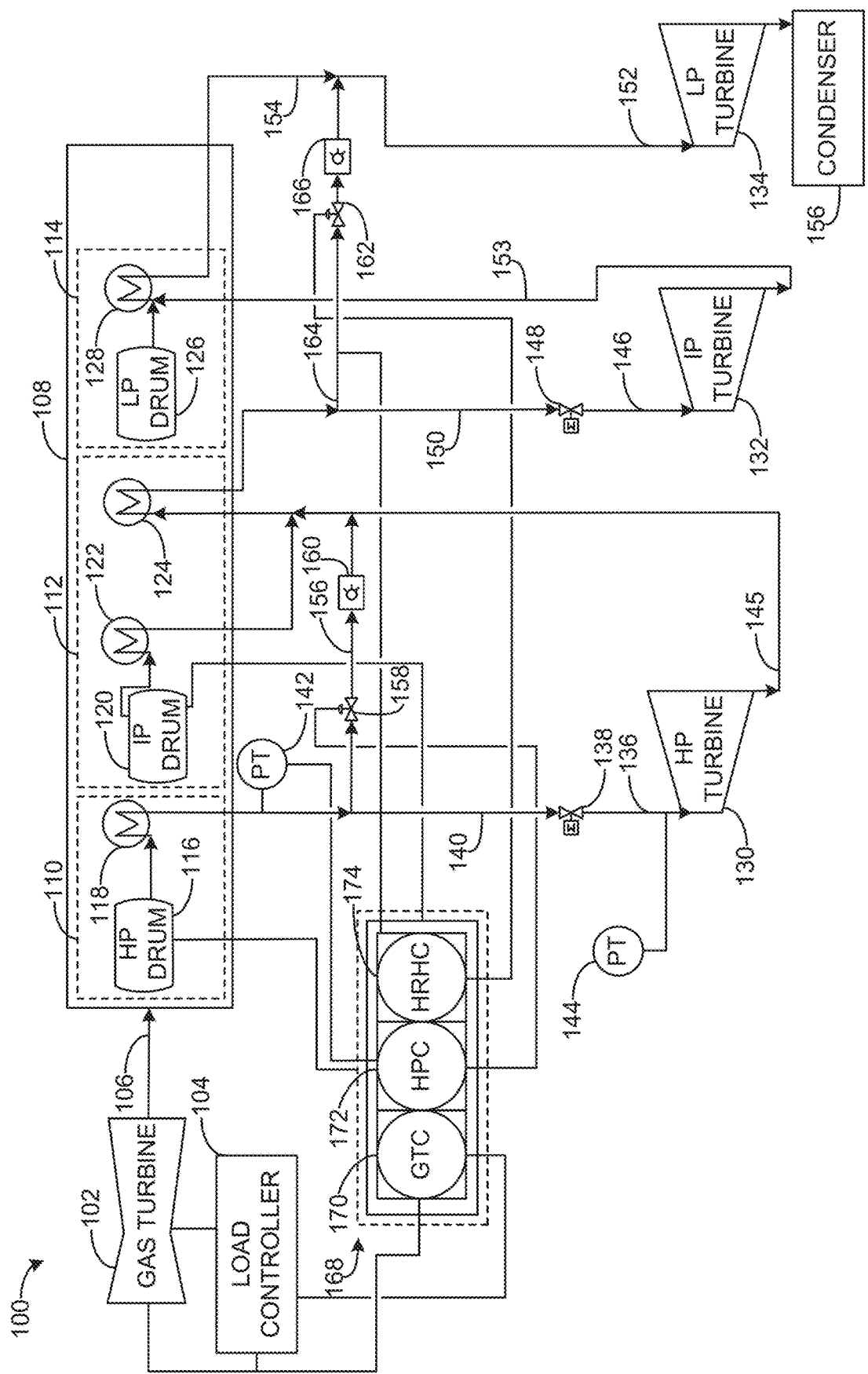
FIG. 1 is a schematic diagram illustrating components of a combined cycle power plant in which the examples disclosed herein may be implemented.

An example method disclosed herein includes predicting a first setpoint for a gas turbine in a combined cycle power plant over a prediction horizon and predicting a second setpoint for a steam generator over the prediction horizon. The example method includes identifying a first steam property of steam generated by the steam generator in the combined cycle power plant based on the second setpoint. The example method includes comparing the first steam property to a second steam property of steam associated with a steam turbine in the combined cycle power plant and dynamically adjusting at least one of the first setpoint or the second setpoint based on the comparison.

An example system disclosed herein includes a controller to predict a first setpoint of a gas turbine based on a prediction model and a first weighting factor. In the example system, the controller is to predict a second setpoint of a steam generator associated with the gas turbine based on the prediction model and a second weighting parameter. Also, in the example system, the controller is to determine a position of a valve of the steam generator based on the second setpoint. The example system includes an adjuster to adjust at least one of the first weighting factor or the second weighting factor based on the determination. In the example system, if the first valve is in a first position, the controller is to predict at least one of a third setpoint of the gas turbine or a fourth setpoint of the steam generator based on the prediction model and the respective adjusted first weighting factor or the adjusted second weighting factor to move the first valve to a second position to decrease an amount of steam flowing through the valve.

Another example method disclosed herein includes predicting a load setpoint for a gas turbine and a steam ramp setpoint for a steam generator operatively coupled to the gas turbine. The example method includes determining a position of a bypass valve of the steam generator based on the load setpoint and the steam ramp setpoint. The example method includes identifying a first steam property of steam of a steam turbine operatively coupled to the steam generator. The example method includes dynamically adjusting one of the load setpoint or the steam ramp setpoint based on the position of the bypass valve to cause the steam generator to generate steam having a second steam property. The second steam property is substantially identical to the first steam property.

DETAILED DESCRIPTION

As a byproduct of generating electricity, a gas turbine produces exhaust gas. In a combined cycle power plant, rather than being treated as waste and removed through an exhaust stack, the exhaust gas is routed through a heat recovery steam generator (HRSG), which generates steam by using the exhaust gas to heat water. The steam is introduced into or blended with steam at a steam turbine header where it is used by a generator associated with a steam turbine to produce electricity.

The steam introduced to the steam turbine via the HRSG should exhibit certain pressure and temperature qualities. For example, the pressure, temperature, and/or enthalpy (i.e., a function of pressure and temperature) values of the steam generated via the HRSG should substantially match the conditions at the steam turbine header or steam line of the steam turbine (e.g., a source where steam generated from exhaust gas from one or more gas turbines is received into the steam turbine) to avoid placing undue stress on the steam turbine by creating significant pressure, temperature, or enthalpy differentials at the steam header and to enable other HRSGs in the combined cycle power plant to provide steam generated by those HRSGs to the steam header. The steam generated by the HRSG that does not meet the desired pressure, temperature, and/or enthalpy qualities is prevented from being delivered to the steam turbine by a series of control valves that cause the steam to bypass the steam turbine. For example, bypass control valves direct the steam having undesirable pressure, temperature, and/or enthalpy qualities away from the steam turbine to, for example, a condenser, where the steam is condensed into a liquid by cooling the steam. Isolation valves prevent the steam from entering the steam turbine. When the steam generated by the HRSG substantially matches the steam pressure and/or temperature parameters for the steam turbine, the isolation valves open to allow the steam to enter the steam turbine.

Operation of a gas turbine includes determining a load setpoint, or a value that controls a rate at which the gas turbine generates an amount of power (e.g., megawatts (MW)/min). For example, to transition the gas turbine from a non-operating state to producing 100 MW within an hour, an operator may manipulate the load setpoint to meet the target power production within the target time period. As the gas turbine works to produce the target load, or power amount, the amount of exhaust gas that is produced by the gas turbine increases. The increase in the amount of exhaust gas can result in an increase in steam generated by the HRSG. However, the pressure, temperature, and/or enthalpy (i.e., a function of pressure and temperature) qualities of the steam generated by the HRSG as a result of the increased load on the gas turbine may not substantially match the conditions of the steam header. Thus, the steam is bypassed from being introduced into the steam turbine.

A certain amount of bypass steam is needed to cool the HRSG to avoid overheating. However, an excess amount of bypass steam results in efficiency losses for the combined cycle power plant, as the bypass steam is not used by the steam turbine to generate electricity and, thus, is wasted heat. Also, an increase in an amount of bypass steam and, thus, a reduction in an amount of steam provided to the steam turbine can result in increased stress on a condenser of the combined cycle power plant, which ultimately receives the bypass steam and converts the bypass steam to water. Further, an increase in an amount of bypass steam can result in metal fatigue in one or more components of the HRSG.

An HRSG can include multiple sections based on a number of pressure levels with respect to steam generation. For example, a triple pressure HRSG includes a high pressure section, a hot reheat/intermediate (HRH) pressure section, and a low pressure section. Each section of the HRSG includes a steam drum and an evaporator to convert the water in the HRSG into steam. Superheaters heat the steam to raise the temperature of the steam beyond a saturation point. Steam generated from the high pressure, the HRH, and the low pressure sections are provided to the steam turbine.

For example, a high pressure bypass valve and a high pressure isolation valve control the delivery of the high pressure steam to the steam turbine based on the qualities of the high pressure steam (e.g., pressure, temperature, and/or enthalpy). In examples where the high pressure steam is directed through the high pressure bypass valve (i.e., the high pressure isolation valve is closed), the steam is routed through cold reheat piping, where it is cooled, reheated via a reheater, and combined with the steam generated from the intermediate pressure section. The reheated/intermediate pressure steam is routed through a hot reheat (HRH) bypass valve to a condenser or to the steam turbine via a hot reheat isolation valve. Pressure, temperature, and/or enthalpy target values for the steam produced by the HRSG can be used to control the high pressure and HRH bypass valves in view of the desired steam qualities.

Typically, an operator manipulates the gas turbine load setpoint, or a value that controls a rate at which the gas turbine load reaches a target power amount. The operator also manipulates the pressure, temperature, and/or enthalpy setpoints of the high pressure and HRH sections of the HRSG, or values that control the ramp rate (e.g., per second) at which the high pressure and HRH sections generate steam having target pressure (e.g., psi), temperature (e.g., ° F.), and/or enthalpy (e.g., BTU/lb) qualities. In manipulating setpoints for the gas turbine, the high pressure section, and the HRH section, the operator attempts to achieve HRSG steam qualities (e.g. pressure, temperature, and/or enthalpy) that match the conditions at the header(s) of the steam turbine while generating a minimal amount of bypass steam in an effort to reduce efficiency losses. However, a balance between setting the gas turbine load setpoint to achieve target loads while controlling the opening and closing of the bypass valves in view of the qualities of the steam is difficult for an operator to consistently achieve due to the multiple process and manipulated variables that affect operation of the combined cycle power plant.

Disclosed herein are example methods and systems to determine a gas turbine load setpoint, a high pressure ramp setpoint (e.g., with respect to the steam generated in the high pressure section of the HRSG), and a HRH ramp setpoint (e.g., with respect to the steam generated in the HRH section of the HRSG). The high pressure ramp setpoint and the HRH ramp setpoint can be a pressure setpoint, a temperature setpoint, or an enthalpy setpoint with respect to the generation of the steam in the respective sections of the HRSG. Also, in some examples, the gas turbine setpoint is a temperature setpoint with respect to a temperature of the exhaust gas instead of a load setpoint. The examples disclosed herein determine the setpoints to load the gas turbine and ramp the high pressure and HRH sections to generate steam having, for example, enthalpies to match the enthalpy conditions at the steam turbine header. In determining the optimal setpoints, the examples disclosed herein minimize the amount of steam that is bypassed from the steam turbine via the opening of the bypass valves.

In the disclosed example methods and systems, the setpoints are determined using model predictive control (MPC) logic that predicts the setpoints over a look-ahead period or a prediction horizon. In determining the setpoints, the MPC logic considers various process constraints with respect to the gas turbine and the HRSG, control weights such as target loads or start-up times, and economic considerations such as gas turbine emission compliance requirements and fuel costs. Further, the disclosed examples include model adaption mechanisms to adapt heat transfer models or enthalpy models used by the disclosed examples to determine the setpoints based on conditions (e.g., temperature) at the HRSG. Based on the multiple variables and weighting factors, the MPC logic determines optimal setpoints for the gas turbine and the high pressure and HRH sections of the HRSG that substantially achieve target operational values while minimizing the production of excess bypass steam.

Turning to the figures, FIG. 1 is a schematic diagram of an example system 100 showing components of a combined cycle power plant in which the examples disclosed herein may be implemented. The example system 100 includes a gas turbine 102. One or more controllers control the operation of the gas turbine 102. For example, a load controller 104 can control the load or amount of power generated by the gas turbine 102. As disclosed above, during operation, the gas turbine 102 produces exhaust gas 106. In the example system 100, the exhaust gas 106 exits the gas turbine 102 and enters a heat recovery steam generator (HRSG) 108.

The example HRSG 108 of FIG. 1 includes a high pressure (HP) section 110, a hot reheat/intermediate pressure (HRH/IP) section 112, and a low pressure (LP) section 114. The HP section 110 includes a high pressure drum 116 and a high pressure superheater 118. The HRH section 112 includes an intermediate pressure drum 120, an intermediate pressure superheater 122, and a reheater 124. The low pressure section 114 includes a low pressure drum 126 and a low pressure superheater 128. Steam generated by the respective sections 110, 112, 114 of the HRSG 108 is provided to a steam turbine. In the example system 100 of FIG. 1, the steam turbine includes a high pressure steam turbine 130, an intermediate pressure steam turbine 132, and a low pressure steam turbine 134. The example system 100 of FIG. 1 can include additional gas turbines and/or steam turbines (e.g., four gas turbines feeding into one header that provides steam to two steam turbines).

In operation, when the steam generated by the high pressure section 110 has qualities (e.g., pressure) that substantially match the conditions of a high pressure steam turbine header 136 of the high pressure steam turbine 130, a high pressure isolation valve 138 opens to allow the steam from the high pressure section 110 of the HRSG 108 to flow into the high pressure steam turbine 130, as represented in FIG. 1 by a high pressure steam flow path 140.

For example, a first pressure transmitter (PT) 142 measures the pressure of the steam generated by the high pressure section 110. If the pressure measured by the first pressure transmitter 142 substantially matches a pressure measured by a second pressure transmitter 144 associated with the high pressure steam turbine header 136, then the high pressure isolation valve 138 opens to allow the steam to flow into the high pressure steam turbine 130 via the high pressure steam flow path 140. Put another way, the steam generated by the high pressure section 110 blends with steam at the high pressure steam turbine header 136 and the blended steam is delivered to the high pressure steam turbine 130. Additionally or alternatively, the example system 100 can include temperature sensors and/or enthalpy sensors to measure temperature and/or enthalpy values of the steam at the high pressure section 110 and the high pressure steam turbine header 136. The example system 100 can also include pressure transmitters in addition to the first and second pressure transmitters 142, 144.

The steam from the high pressure section 110 that is introduced into the high pressure steam turbine 130 via the high pressure steam turbine header 136 can have a temperature of, for example, 1000° F. and a pressure 2400 psi. In some examples, when the steam from the high pressure section 110 is introduced into the high pressure steam turbine 130, some of the steam is sent back to the HRSG 108 (i.e., not all of the energy is extracted from the steam by the high pressure steam turbine 130). As some of the energy of the steam has been used by the high pressure steam turbine 130 to produce electricity, the temperature and/or pressure of the steam are reduced as compared to the steam delivered to the high pressure steam turbine header 136 (e.g., to a pressure of 700 psi) and, thus, the steam has less enthalpy. In such examples, the steam exiting the high pressure steam turbine 130 follows a first cold reheat flow path 145, where the steam is introduced into the HRH section 112 and reheated by the reheater 124. Raising the temperature of the steam back to, for example, 1000° F. increases the enthalpy of the steam despite the drop in pressure. Thus, the steam can be processed by the HRH section 112 to generate additional steam for delivery to the intermediate pressure steam turbine 132.

When the steam generated by the HRH section 112 of the HRSG 108 has qualities (e.g., pressure, temperature, and/or enthalpy) that substantially match the conditions at an intermediate pressure steam turbine header 146 of the intermediate pressure steam turbine 132, an HRH isolation valve 148 opens to allow the steam from the HRH section 112 of the HRSG 108 to blend with steam at the intermediate pressure steam turbine header 146 for delivery to the intermediate pressure steam turbine 132, as represented in FIG. 1 by an HRH steam flow path 150. Steam exiting the intermediate pressure steam turbine 132 flows via a second cold reheat flow path 153 as shown in FIG. 1 to the low pressure section 114, where it can be re-heated by the low pressure superheater 128.

In the example system 100, the steam generated at the low pressure section 114 is provided to the low pressure steam turbine 134 via a low pressure steam turbine header 152 as represented by a low pressure steam flow path 154 in FIG. 1. The example system 100 can also include one more pressure, temperature, and/or enthalpy sensors in association with the HRH section 112, the low pressure section 114, the intermediate pressure steam turbine header 146, and the low pressure steam turbine header 152 to measure qualities of the steam throughout the system 100.

The low pressure turbine 134 is associated with a condenser 156. In the example system 100, the steam provided to the high pressure steam turbine 130 and the intermediate pressure steam turbine 132 loses enthalpy as energy of the steam is used to do work, or generate electricity. As disclosed above, the steam exiting the turbines 130, 132 flow through the respective first and second cold reheat flow paths 145, 153 and is received at the lower pressure section 114. After the steam that is reheated by the low pressure superheater 128 is used by the low pressure turbine 134, the steam may not have sufficient enthalpy to be used further in the example system 100 without requiring significant energy expenditure to reheat or increase the pressure of the steam. As such, the steam is delivered to the condenser 156, where it is converted to water. Thus, in the example system 100, the steam generated by the HRSG 108 that is not used by the turbines 130, 132, 134 is converted to water.

As disclosed above, at a given time, one or more qualities of the steam generated by the HRSG 108 may not match or substantially match the conditions at the steam turbine headers 136, 146, 152. For example, if the pressure of the steam generated by the high pressure section 110 and measured by the first pressure transmitter 142 is substantially less than a pressure at the high pressure steam turbine header 136 as measured by the second pressure transmitter 144, then the high pressure isolation valve 138 will not open. In such examples, the steam generated by the high pressure section 110 is prevented from blending with steam at the high pressure steam turbine header 136 and being introduced into the high pressure steam turbine 130.

As illustrated in FIG. 1, steam generated by the high pressure section 110 of the HRSG 108 from the exhaust gas 106 that does not exhibit one or more of pressure, temperature, or enthalpy qualities that substantially match the conditions at the high pressure steam turbine header 136 flows through a first bypass flow path 156 In such examples, the high pressure isolation valve 138 is closed and a high pressure bypass valve 158 is open to direct the steam generated by the high pressure section 110 via the first bypass flow path 156. In the example system 100, the steam from the high pressure section 110 flowing through the bypass flow path 156 is cooled by a first water spray 160 to prevent overheating of the HRSG 108. The steam flows to the HRH section 112 of the HRSG 108, where it is combined with the intermediate pressure steam and reheated by the reheater 124 as part of generating steam via the HRH section 112.

If the pressure, temperature, and/or enthalpy qualities of the steam generated by the HRH section 112 do not substantially match the conditions at the intermediate pressure steam turbine 132, the HRH isolation valve 148 is closed and a HRH bypass valve 162 is opened such that the steam from the HRH section 112 flows via a second bypass flow path 164. In some examples, the steam flowing through the second bypass flow path 164 is cooled via a second water spray 166. The bypass steam flowing via the second bypass flow path 164 is directed to the low pressure steam turbine 134 to drive the low pressure steam turbine 134. The bypass steam that is not used by the lower pressure steam turbine 134 (i.e., not all of the energy is extracted from the bypass steam by the low pressure steam turbine 134) is delivered to the condenser 156, where it is converted to water.

Thus, in the example system 100, the isolation valves 138, 148 and the bypass valves 158, 162 control a flow of the steam generated by the high pressure and HRH sections 110, 112 of the HRSG 108 based on qualities, properties, or conditions of the steam such as pressure or enthalpy relative to the conditions at the high pressure and intermediate pressure steam turbine headers 136, 146. The example system 100 can include isolation valves and/or bypass valves in addition to the isolation valves 138, 148 and the bypass valves 158, 162. However, generating steam having qualities that are acceptable for introducing the steam into the high pressure and intermediate pressure steam turbines 130, 132 can be difficult in view of operation of the gas turbine 102. As the gas turbine 102 operates to reach target loads, more exhaust gas 106 may be generated and captured by the HRSG 108. The HRSG 108 produces steam from the captured exhaust gas 106. However, too much steam generated by the HRSG 108 can result in excess bypass steam. For example, if the steam generated by the high pressure section 110 of the HRSG 108 from the exhaust gas 106 is not acceptable for blending with the steam at the high pressure steam turbine header 136, the high pressure bypass valve 158 opens. As the gas turbine continues to produce exhaust gas 106, the high pressure section 110 continues to generate steam. Following the first bypass flow path 156, the steam from the high pressure section 110 enters HRH section 112, where additional steam is generated. The steam generated at the HRH section 112 can also result in bypass steam. Thus, opening the high pressure bypass valve 158 can result in bypass steam that is not used by the high pressure steam turbine 130 and, thus, is waste heat.

The example system 100 includes a model predictive controller 168 (hereinafter "the controller 168") to determine optimal loading of the gas turbine 102 and ramping of the HRSG 108 with respect to generating steam while minimizing an amount of bypass steam. The controller 168 determines a load ramp setpoint for the gas turbine 102 for the gas turbine 102. The controller 168 also determines setpoints for high pressure section 110 and the HRH section 112 to generate steam having one or more qualities (e.g., pressure, temperature, enthalpy) in view of the conditions at the respective steam turbines 130, 132. In predicting the setpoints, the controller 168 controls the response of the bypass valves 158, 162 to the steam (e.g., a pressure of the steam) to minimize the amount of bypass steam generated. As will be disclosed below in connection with FIG. 2, the controller 168 predicts the setpoints for the gas turbine 102 and the high pressure and HRH sections 110, 112 of the HRSG 108 based on one or more inputs (e.g., from the pressure transmitter 142) and adjusts the predicted setpoints in view of process constraints, economic considerations, and model adaptations. The example system 100 can include one or more controllers for implementing the setpoints determined by the controller 168. For example, a gas turbine load target controller (GTC) 170, a high pressure steam controller (HPC) 172, and a HRH steam controller (HRHC) 174 are associated with the controller 168 for receiving and responding to control signals generated by the controller 168.

Figure 2:
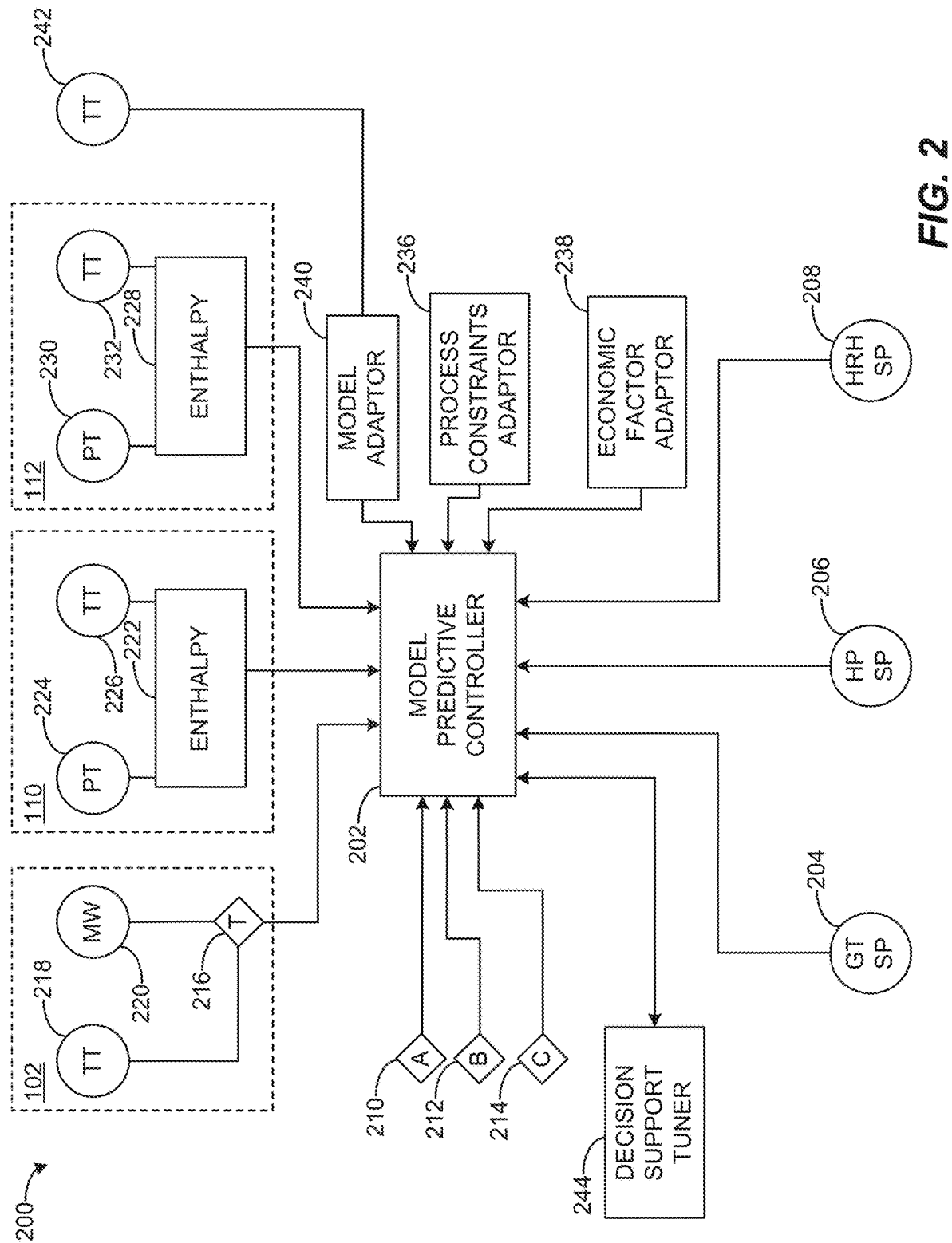
FIG. 2 is block diagram of an example control system for determining setpoints of one or more components of the combined cycle power plant illustrated in FIG. 1.

FIG. 2 is a block diagram 200 of an example control system 200 including an example model predictive controller 202 that may be used to implement the controller 168 of FIG. 1. For illustrative purposes, the example control system 200 will be disclosed in connection with the example combined cycle power plant system 100 of FIG. 1. However, the example control system 200, including the controller 202, can be used with other combined cycle power plant systems.

The controller 202 of FIG. 2 determines or predicts a load setpoint 204 for the gas turbine 102 of FIG. 1. In the example control system of FIG. 2, the controller 202 also determines a first enthalpy setpoint 206 for the high pressure section 110 of the HRSG 108 and a second enthalpy setpoint 208 for the HRH section 112. However, the example controller 202 can determine pressure setpoints, temperature setpoints, and/or other combinations thereof for the high pressure section 110 and the HRH section 112. Also, in some examples, the gas turbine setpoint can be a temperature setpoint with respect to a temperature of the exhaust gas instead of a load setpoint. Further, although the controller 202 of FIG. 2 determines three setpoints corresponding to the respective gas turbine 102, the high pressure section 110, and the HRH section 112, the controller 202 can consider fewer variables and determine setpoints for, for example, only the gas turbine 102 and the high pressure section 110. In some examples, the controller 202 determines a setpoint for the low pressure section 114 of the HRSG 108.

The controller 202 receives input values (e.g., user inputs) with respect to target setpoints for the gas turbine 102, the high pressure section 110, and the HRH section 112. For example, the controller 202 receives (1) a target load setpoint 210 for the gas turbine 102, (2) a first target enthalpy setpoint 212 for the high pressure section 110, and (3) a second target enthalpy setpoint 214 for the HRH section 112. For example, the gas turbine target load setpoint 210 can be a value or rate (e.g., MW/min) that will move the gas turbine 102 from a non-operational state (e.g., generating 0 MW) to an operational state generating a predetermined amount of megawatts (e.g., 100 MW). The first target enthalpy setpoint 212 can be a rate at which the high pressure section 110 generates steam having an enthalpy value (e.g., in BTU/lb) that substantially matches an enthalpy value of steam at the high pressure steam turbine header 136 (e.g., in BTU/lb) of the high pressure steam turbine 130. The second target enthalpy setpoint 214 can be a rate at which the HRH section 112 generates steam having an enthalpy value that substantially matches an enthalpy value at the intermediate pressure steam turbine header 146 of the intermediate pressure steam turbine 132 of FIG. 1.

The controller 202 also receives inputs related to the actual or current operating conditions of the gas turbine 102, the high pressure section 110, and the HRH section 112. For example, an input from the gas turbine 102 can include a temperature 216 of the exhaust gas 106. The temperature 216 can be determined directly from a temperature measurement 218 of the exhaust gas 106 or derived from a current load (e.g., megawatts) 220 being generated by the gas turbine 102, which affects the temperature 216 of the exhaust gas 106 as the gas turbine 102 performs work.

Inputs are also sent to the controller 202 from the high pressure section 110 of the HRSG 108. For example, a first enthalpy value 222 can be determined based on a steam pressure measurement 224 and a steam temperature measurement 226 of the steam generated in the high pressure section 110. Similarly, inputs received by the controller 202 from the HRH section 112 include a second enthalpy value 228 based on a steam pressure measurement 230 and a steam temperature measurement 232 of the steam generated in the HRH section 112. The steam pressure measurements 224, 230 and the steam temperature measurements 226, 232 can be provided to the controller 202 by pressure and temperature sensors, such as the first pressure transmitter 142 of FIG. 1. In some examples, the steam pressure, temperature, and/or enthalpy values at the HRSG 108 (and/or the steam turbines 130, 132, 134) can be obtained from known steam curves based on empirical data.

To predict the setpoint values 204, 206, 208, the controller 202 implements one or more optimization equations based on the inputs 210, 212, 214, 216, 222, 228. In performing the optimization, the controller 202 also considers other factors that affect the ramping of the gas turbine 102, the high pressure section 110, and the HRH section 112. For example, a process constraint adaptor 236 provides one more process constraints to the controller 202 that may limit the implementation of the predicted setpoints 204, 206, 208 in view of physical and/or operational limitations of one or more components of the combined cycle power plant. Examples of the process constraints provided by the process constraint adaptor 236 include a minimum and/or a maximum rate at which the gas turbine 102 can be ramped to produce a target load without damaging the gas turbine 102; a maximum amount of stress (e.g., thermal stress) that the HRSG 108 can withstand; maximum ramp rates with respect to reaching pressure and/or temperature values for the steam generated in the high pressure section 110 and/or the HRH section 112; and drum levels indicative of an amount of water available in the high pressure section 110 and/or the HRH section 112 for conversion to steam.

The example control system includes an economic factor adaptor 238. The economic factor adaptor 238 provides one or more economic factor inputs to the controller 202 for consideration when determining the setpoints 204, 206, 208. For example, requirements or compliance demands with respect to gas turbine emissions can serve as a weighting factor in determining the optimal load setpoint 204 for the gas turbine 102. Also, fuel costs for the gas turbine can also serve as a weighting factor or constraint with respect to determining the optimal load setpoint 204 for the gas turbine 102. In some examples, weighting factors such as emission limitations are provided via user input.

The example control system 200 also includes a model adaptor 240 that adjusts the models or algorithms employed by the controller 202 in determining the setpoints 204, 206, 208. For example, one or more heat transfer models used by the controller 202 can be adjusted by the model adaptor 240 based on conditions 242 of the HRSG 108, such as a metal temperature of the drums 116, 120, 126 of the HRSG 108 or tubes of the HRSG 108 in which the steam is generated.

Based on the inputs provided to the controller 202 as disclosed above, the controller 202 employs model predictive control (MPC) logic to predict the gas turbine load setpoint 204, the first enthalpy setpoint 206 for the high pressure section 110, and the second enthalpy setpoint 208 for the HRH section 112. For example, a predicted process output of the MPC logic with respect to the gas turbine load setpoint 204 represents a load response of the gas turbine 102 based on a control input generated by the controller 202 and provided to the gas turbine 102. MPC logic provides for optimization of future behavior of a process over a finite prediction time period or a prediction horizon. In particular, the MPC logic computes a control signal that minimizes an objective function such that a predicted output variable follows or substantially follows a reference trajectory. In the example control system 200, the controller 202 uses MPC logic to optimize the behavior (e.g., the operational behavior) of the gas turbine 102 such that a predicted process output or predicted load setpoint output trajectory approaches the target load setpoint 210. Similarly, in predicting the enthalpy setpoints 206, 208 for the high pressure and HRH sections 110, 112 of the HRSG 108, the controller 202 attempts to optimize the behavior or operation of the high pressure and HRH sections 110, 112 in view of the target enthalpy setpoints 212, 214, which can correspond to the conditions at the headers 136, 146 of the steam turbines 130, 132.

The controller 202 also uses the MPC logic to adjust the predicted load setpoint 204 for the gas turbine and the predicted setpoints 206, 208 for the high pressure and HRH sections 110, 112 to minimize the amount of bypass steam. For example, in determining the first enthalpy setpoint 206 and the second enthalpy setpoint 208, the controller 202 considers the behavior (e.g., opening or closing) of the bypass valves 158, 162 in response to the steam generated by the high pressure section 110 and the HRH section 112 based on the respective first and second enthalpy setpoints 206, 208. The controller 202 also determines an amount of exhaust gas that will be generated by the gas turbine 102 as the gas turbine 102 ramps based on the load setpoint 204. If the controller 202 determines that operation of the gas turbine and/or the HRSG 108 based on the load setpoint 204, the first enthalpy setpoint 206, and/or the second enthalpy setpoint 208 will cause one or more of the bypass valves 158, 162 to open and an excess amount of bypass steam to be produced (e.g., based on a predetermined threshold), the controller 202 dynamically adjusts the predicted setpoints 204, 206, 208. Thus, the controller 202 determines the predicted setpoints 204, 206, 208 in view of the target setpoints 210, 212, 214 while optimally minimizing an amount of steam flowing through the first and second bypass flow paths 156, 164.

To balance the predicted setpoints 204, 206, 208 with respect to achieving or substantially achieving the target setpoints 210, 212, 214 while minimizing the amount of bypass steam, the controller 202 applies control weights to determine the setpoints 204, 206, 208. For example, increasing the rate at which the gas turbine 102 generates a load results in an increased amount of exhaust gas and, thus, steam. The increased amount of steam can cause the bypass valves 158, 162 to open more than required to reach load targets and, thus, result in excess bypass steam. In such examples, the controller 202 may respond by reducing the load response of the gas turbine load, thereby applying less weight to achieving the gas turbine target load setpoint 210 in view of the potential for excess bypass steam.

As another example, the controller 202 can predict pressure setpoints for the high pressure and HRH sections 110, 112. As the gas turbine 102 transitions from a non-operating state to an operating state producing, for example, 100 MW, within a predetermined amount of time, the controller 202 may initially increase the pressure setpoint for the high pressure section 110 to maintain a certain steam pressure value during the transition period for the gas turbine. As the time for the gas turbine 102 to produce 100 MW approaches, the controller 202 dynamically adjusts the weight applied to the gas turbine load setpoint 204 by automatically increasing the gas turbine load setpoint 204 so that the gas turbine 102 achieves the 100 MW target within the predetermined amount of time. The controller 202 may give less weight to the pressure setpoint of the high pressure section 110 by reducing a response speed of the pressure setpoint. The controller 202 reduces the pressure response of the high pressure section 110 to regulate the opening of the bypass valve 158 in view of the increased steam production resulting from the increased exhaust gas production (i.e., due to the increased gas turbine load setpoint 204). Thus, the controller 202 dynamically adjusts the setpoints 204, 206, 208 to optimize the behavior or operation of the gas turbine, the HRSG 108, and the bypass valves 158, 162 in view of the target setpoints 210, 212, 214 while limiting the amount of excess bypass steam.

As an example of the MPC logic implemented by the controller 202 to determine, for example, the gas turbine load setpoint 204, a current or real-time state of the gas turbine 102 is sampled at a sampling time k to obtain initial conditions for one or more state variables associated with the gas turbine 102. In general, a multi-input and multi-output plant can be described by the following state space equations:

$$x(k+1) = Ax(k) + Bu(k) \quad \text{(Eq. 1a); and}$$

$$y(k) = Cx(k) \quad \text{(Eq. 1b);}$$

where x is a state variable vector; u is a control input vector; y is a process output vector; and A, B, and C are constants.

An MPC optimization at time k can be performed based on the following conventions and expressions. A measured state variable of the gas turbine 102 at time k can be described by the expression $x(k|k) = x(k)$ and an estimated state variable at time k can be described as $\hat{x}(k|k)$. Also, a prediction horizon for the optimization can be represented by the variable $H_p$ and a control horizon can be represented by the variable $H_c$. One or more predicted state variables at time k+i based on the measured state variable x(k) (or the estimated state variable $\hat{x}(k|k)$) can be described as $x^p(k+i|k)$, where (i=1, ..., $H_p$). Also, one or more predicted control input variables at time k+i can be described as $u^p(k+i-1|k)$, where (i=1, ..., $H_p$). Based on the foregoing conventions and expressions, the MPC logic can be implemented by the controller 202 as follows.

First, initial or estimated conditions for one or more state variables x at time k are obtained. The estimated state variable $\hat{x}(k|k)$ at time k can be obtained using the following state estimation equation:

$$\hat{x}(k|k) = (A - K_e CA) \cdot \hat{x}(k-1|k-1) + (B - K_e CB) \cdot u(k-1) + K_e y(k) \quad \text{(Eq. 2),}$$

where $K_e$ is a predefined state estimator gain and y(k) is a real-time measurement of the output variable y(k).

To optimize the ramp rate of the gas turbine 202 at the current sampling time k, a predicted state variable $x^p(k|k)$ is defined such that $x^p(k|k) = \hat{x}(k|k)$, where $\hat{x}(k|k)$ is the estimated state variable found using Equation 2 above. The following optimization is solved at the sample time k to minimize a difference between a predicted process output $y^p$ and a target setpoint $y_{set}$ (e.g., the target load setpoint 210) and to determine a predicted control input or demand signal $u^p$ that represents the turbine load demands to be placed on the gas turbine 102:

$$\min_{u^p(k|k),\ldots,u^p(k+H_p-1|k)} \sum_{i=1}^{H_p} \left\{ \left\| \begin{array}{c} y^p(k+i+1|k) - y_{set} + \\ y_d^p(k+i+1|k) + err(k) \end{array} \right\|_Q^2 + \|\Delta u^p(k+i|k)\|_R^2 \right\}, \quad \text{(Eq. 3)}$$

where $err(k) = y(k) - y^p(k|k);$ (Output Error)

$x^p(k+i+1|k) = Ax^p(k+i|k) + Bu^p(k+i|k)$ (State equation);

$y^p(k+i|k) = Cx^p(k+i|k)$ (Output equation);

$u^p(k+H_c+j|k) = u^p(k+H_c|k),$ $(j = 1, 2, \ldots, H_p - H_c)$ and $|u^p(k+i|k)| \leq U_{max}$ (Control input constraints);

$|y^p(k+i|k)| \leq Y_{max}$ (Process output constraints);

and $(i = 0, 1, \ldots, H_p).$

The output equation is used to calculate the predicted process output $y^p$ or the load response of the gas turbine 102. To minimize the difference between the predicted process output $y^p$ and the target setpoint $y_{set}$, Equation 3 accounts for any error between the process output y(k) (e.g., the actual process output at time k) and the predicted output $y^p(k|k)$ at time k, as represented by output error equation err(k), above. Further, constraints on the predicted process output $y^p$ are accounted for in the optimization process of Equation 3. For example, the process output constraints $Y_{max}$ define an expected boundary or range for the predicted process output $y^p$. The process output constraints $Y_{max}$ can be considered to be soft constraints in that the process output constraints $Y_{max}$ represents performance of the gas turbine 102 in terms of process deviations from the expected range for the predicted process output $y^p$. In some examples, the predicted process output $y^p$ can deviate from (e.g., exceed) the process output constraints $Y_{max}$ if the optimization of Equation 3 encounters a feasibility problem with respect to minimizing the difference between the predicted process output $y^p$ and the target setpoint $y_{set}$. In such examples, the process output constraints $Y_{max}$ can be relaxed in an effort to increase a likelihood of finding a feasible solution for optimizing the setpoint.

The predicted process control input signal $u^p$ is sent to a gas turbine controller (e.g., the controllers 104, 170) and represents a load demand to which the gas turbine 102 responds (e.g., by generating or substantially generating the predicted process output $y^p$). Upon receipt of the process control input signal $u^p$ by the gas turbine controller, the process control input signal $u^p$ is converted to one or more device control signals, such as a fuel input signal or a turbine governing valve position signal based on the load demands associated with the process input signal $u^p$. The optimization of Equation 3 constrains the predicted process control input signal $u^p$ in view of physical or operational limitations of the gas turbine 102. For example, the control input constraints $U_{max}$ represent physical or operational limitations (e.g., load) of one or more components of the gas turbine 102. The control input constraints $U_{max}$ limit the predicted process control input signal $u^p$ in view of the physical or operational limitations of the turbine components with respect to ramping the gas turbine 102 in response to the load demand. In contrast to the process output constraints $Y_{max}$, the control input constraints $U_{max}$ are hard constraints as they represent the physical or operational limitations of one or more components of the turbine 102 that cannot be deviated from without damage to the gas turbine 102.

In Equation 3, the parameters Q and R are weighting factors with respect to the predicted process output $y^p$ and the predicted control input signal $u^p$. For example, if the Q parameter has a large value relative to the R parameter, the predicted control input signal $u^p$ results in more aggressive load demands placed on the gas turbine 102 by the controller 202 (e.g., resulting in a faster ramp rate) as compared to when the R parameter has a larger value relative to the Q parameter (e.g., a slower ramp rate but, in some examples, a more stable response by the gas turbine 102). In some examples, the values of the parameters Q and R are set based on predetermined or empirical values. The values of the parameters Q and R can be adjusted in view of one or more of, for example, the target setpoint $y_{set}$, the predicted process output $y^p$, and/or the predicted control input signal $u^p$.

After completion of the optimization of Equation 3 at time k, the predicted control input variable $u^p$ is set as the control input signal u(k) at time k such that u(k)=$u^p(k|k)$. In setting the control input signal u(k) as the (e.g., first) predicted control input variable $u^p$, a control signal representative of the predicted control input $u^p(k|k)$ at time k is sent to the gas turbine controller. Thus, in the above disclosed MPC logic, the predicted control input $u^p(k|k)$ is the actual control input signal sent to the gas turbine controller.

In implementing the MPC logic disclosed above, the steps of identifying the initial conditions for the state variables and performing the optimization of Equation 3 are repeated for a subsequent real-time (e.g., actual) sampling time k+1. A new predicted control input signal $u^p(k+1)$ is determined and the control input signal u(k+1) is set as the predicted control input signal $u^p(k+1)$. Thus, the predicted control input signal $u^p$ at each sampling time k, k+1, k+n, etc. serves as the control input signal sent to the gas turbine controller. The MPC logic disclosed above (e.g., in connection with equations 1a-3) can be implemented by the controller 202 to determine the first and second setpoints 206, 208 (e.g., enthalpy setpoints) for the high pressure and HRH sections 110, 112 and to generate control signals corresponding to the setpoints 206, 208 in substantially the same manner as disclosed with respect to the gas turbine setpoint 204. Thus, the controller 202 uses a systematic model to determine setpoints for components of, for example, the combined cycle power plant 100 of FIG. 1.

The control signals generated by the controller 202 are sent to respective controllers associated with the gas turbine 102, the high pressure section 110, and the HRH section 112 (e.g., the controllers 170, 172, 174). Upon receipt of the control signals, the control signals are converted to one or more device control signals to, for example, ramp the gas turbine 102 to produce a load or, for example, to ramp the high pressure section 110 to produce steam having a certain enthalpy value. In some examples, the example control system 200 includes a decision support tuner 244 that evaluates the implementation of the predicted setpoints during operation of the gas turbine 102 and/or the HRSG 108 and dynamically tunes the controller 102 (e.g., adjusts the algorithms or weighting factors applied by the controller 102) as part of a feedback mechanism.

For example, if a current pressure of steam generated at the high pressure section 110 is 800 psi and the pressure of steam at the high pressure steam turbine header 136 of the high pressure steam turbine 130 is 2000 psi, the controller 202 determines an optimal pressure setpoint such that the pressure of the steam generated at the high pressure section 110 matches or substantially matches 2000 psi for blending with the steam at the high pressure steam turbine header 136. The controller 202 generates a control input signal corresponding to the pressure setpoint to ramp the high pressure section 110 from producing steam having a pressure of 800 psi to steam having a pressure of 2000 psi. In response to the control input signal, a controller associated with the high pressure section 110 produces one or more device control signals to increase the pressure of the steam generated by the high pressure section 110. Such an increase in steam pressure may be achieved in stepwise increments during operation of the high pressure section 110 over a period of time (e.g., as predicted by the controller 202 over the prediction horizon). Further, in determining the optimal pressure setpoint, the controller 202 considers the effect of the pressure change on the movement of the bypass valves 158, 162. If the pressure setpoint causes the bypass valves 158, 162 to open, the controller 202 may dynamically adjust the control signal sent to the controller of the high pressure section 110 to avoid creation of excess bypass steam.

In other examples, the control input signals generated by the controller 202 can be sent to the bypass valves 158, 162.

For example, the control input signals corresponding to predicted pressure setpoints for the high pressure section 110 and/or the HRH section 112 can be converted to valve position signals that control a degree to which the bypass valves 158, 162 are open to regulate the steam pressure. In such examples, the controller 202 may also consider ramp rate constraints with respect to, for example, the high pressure section 110. Accounting for ramp rate constraints of the HRSG 108 prevents the controller from attempting to generate a change in pressure from, for example 800 psi to 2000 psi, via a single valve position change, thereby risking destabilization of the HRSG 108.

Thus, the example control system 200 including the example controller 202 accounts for multiple process variables and constraints to optimize the operational trajectories of the gas turbine 102 and the HRSG 108 with respect to generating power, producing steam having qualities that substantially match the conditions of the steam turbines, and minimizing an amount of bypass steam. In some examples, the behavioral or operational trajectories of the gas turbine and/or the HRSG 108 are calculated iteratively by the controller 202 for one or more predicted setpoints over time to create profiles that represent the responses of the gas turbine 102 and/or the HRSG 108 over the prediction period. In determining the setpoints, the controller 202 considers the movement of the bypass valves 158, 162 in view of the qualities of the steam (e.g., enthalpy, pressure) generated by the HRSG 102 to not generate excess bypass steam. In performing the optimization, the controller 202 also considers process constraints to not damage or stress the gas turbine 102 and/or the HRSG 108 by, for example, sending commands to increase load or steam temperature at a rate that can result in stress on the gas turbine 102 and/or the HRSG 108. Based on the target setpoints and the various process constraints, variables, weights, and models, the controller 202 determines the optimal setpoints for loading the gas turbine 102 and ramping the high pressure and HRH sections 110, 112 of the HRSG 108 while minimizing the production of excess bypass steam.

While an example manner of implementing the combined cycle power plant of FIG. 1 is illustrated in FIG. 2, one or more of the elements, processes and/or devices illustrated in FIG. 2 may be combined, divided, re-arranged, omitted, eliminated and/or implemented in any other way. Further, the example model predictive controller 202, the example process constraint adaptor 236, the example economic factor adaptor 238, the example model adaptor 240, the example decision support tuner 244, and/or, more generally, the example control system 200 of FIG. 2 may be implemented by hardware, software, firmware and/or any combination of hardware, software and/or firmware. Thus, for example, example model predictive controller 202, the example process constraint adaptor 236, the example economic factor adaptor 238, the example model adaptor 240, the example decision support tuner 244, and/or, more generally, the example control system 200 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, the example model predictive controller 202, the example process constraint adaptor 236, the example economic factor adaptor 238, the example model adaptor 240, and the example decision support tuner 244 are hereby expressly defined to include a tangible computer readable storage device or storage disk such as a memory, a digital versatile disk (DVD), a compact disk (CD), a Blu-ray disk, etc. storing the software and/or firmware. Further still, the example control system 200 of FIG. 2 may include one or more elements, processes and/or devices in addition to, or instead of, those illustrated in FIG. 2, and/or may include more than one of any or all of the illustrated elements, processes and devices.

Figure 3:
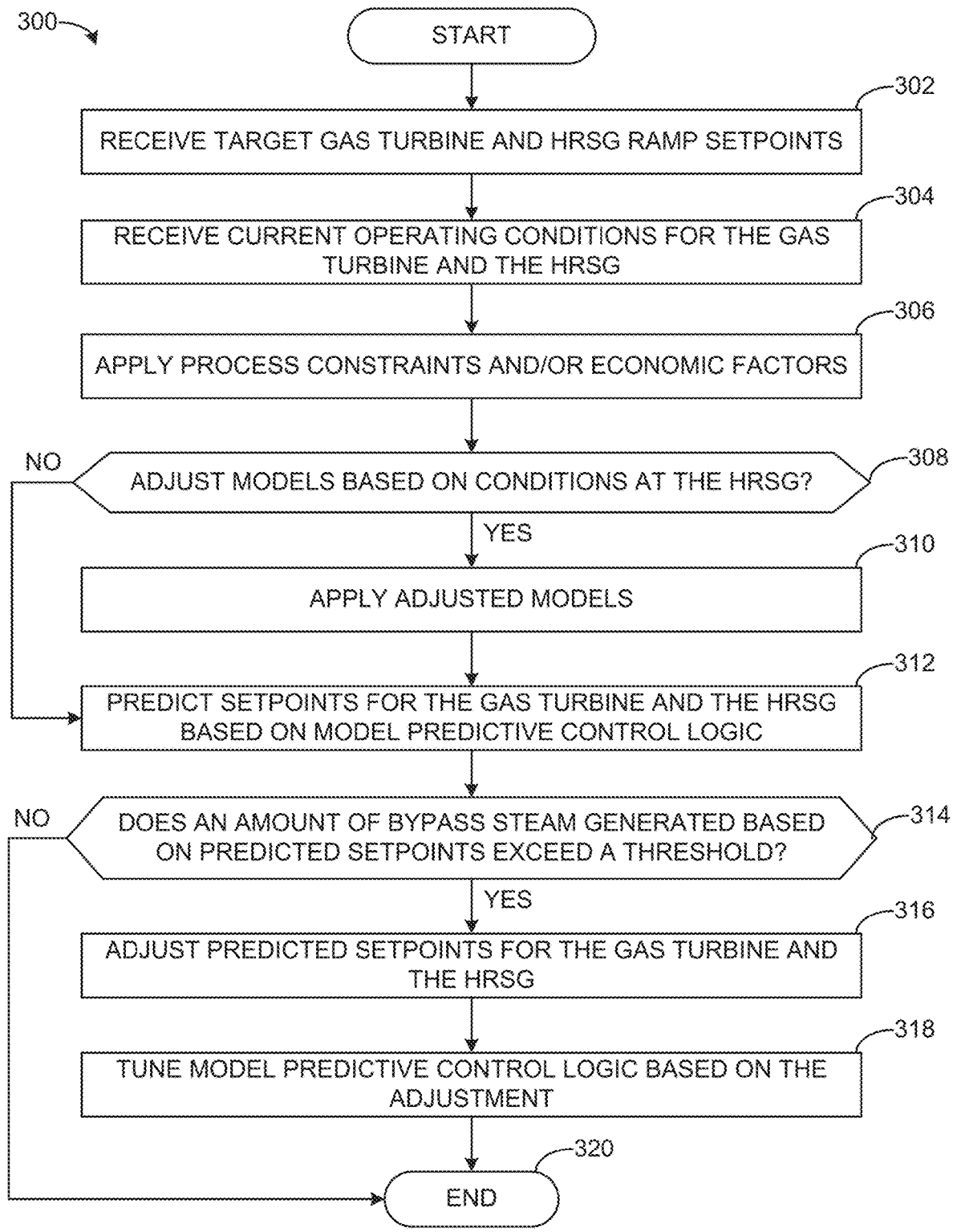
FIG. 3 is a flow diagram of an example method that may be executed to implement the example control system of FIG. 2.

A flowchart representative of an example method that may be used to implement the example control system 200 of FIG. 2 is shown in FIG. 3. In this example, the method may be implemented using machine readable instructions that comprise a program for execution by a processor such as the processor 412 shown in the example processor platform 400 discussed below in connection with FIG. 4. The program may be embodied in software stored on a tangible computer readable storage medium such as a CD-ROM, a floppy disk, a hard drive, a digital versatile disk (DVD), a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowchart illustrated in FIG. 3, many other methods of implementing the example control system 200 may alternatively be used. For example, the order of execution of the blocks may be changed, and/or some of the blocks described may be changed, eliminated, or combined.

As mentioned above, the example method of FIG. 3 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example method of FIG. 3 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 3 illustrates a flowchart representative of an example method 300 that can be implemented by a controller (e.g., the model predictive controller 168, 202 of FIGS. 1 and 2) of a combined cycle power plant to predict setpoints for a gas turbine (e.g., the gas turbine 102 of FIG. 1) and an HRSG (e.g., the HRSG 102 of FIG. 1). The example method 300 begins with receiving input values for a target gas turbine setpoint (e.g., a load setpoint or an exhaust gas temperature setpoint), and target setpoints for one or more pressure levels of the HRSG, such as a high pressure section (e.g., the high pressure section 110 of FIG. 1) and an HRH section (e.g., the HRH section 114 of FIG. 1) (block 302). The target setpoints for the HRSG can be pressure setpoints, temperature setpoints, or enthalpy setpoints with respect to qualities or conditions of steam produced by the HRSG and in view of steam qualities that will substantially match the steam conditions at one or more steam turbines (e.g., the steam turbines 130, 132, 134 of FIG. 1). The example method 300 also includes receiving current operating conditions for the gas turbine and the HRSG (block 304). The current operating conditions can include, for example, steam pressure, steam temperature, enthalpy values, gas turbine load, and/or exhaust gas temperature.

In addition to receiving inputs related to target setpoints and current operating conditions for the gas turbine and the HRSG, the example method 300 considers other constraints and/or weighting factors to predict the setpoints. The example method 300 includes applying one more process constraints and/or economic factors as part of determining the predicted setpoints (block 306). The process constraints can be physical and/or operational limitations of the gas turbine and/or the HRSG and can be provided by, for example, the process constraint adaptor 236 of FIG. 2. The economic factors can include gas turbine emissions restrictions or fuel costs and can be provided by, for example, the economic factor adaptor 238 of FIG. 2.

As part of predicting the setpoints, the example method 300 accounts for conditions of the HRSG such as metal temperatures of drums in one or more of the sections of the HRSG and/or tubes in the HRSG where steam is produced. In the example method 300, a decision is made as to whether the models or equations (e.g., heat transfer models) used by the controller to predict the setpoints should be adjusted based on the conditions at the HRSG (block 308). If the models should be adjusted, the example method 300 includes applying the adjusted models as part of determining the setpoints (block 310).

Based on the inputs, the process constraints, the economic factors, and/or the adjusted models, the example method 300 predicts setpoints for the gas turbine and the HRSG (e.g., the high pressure section and the HRH section of the HRSG) using model predictive control logic (block 312). For example, a predicted load setpoint for the gas turbine provides a rate at which the gas turbine is to generate a load or an amount of power. In some examples, the predicted load setpoint for the gas turbine is based on the target gas turbine setpoint. One or more predicted setpoints for the HRSG can include pressure setpoints, temperature setpoints, or enthalpy setpoints. In some examples, the one or more predicted setpoints for the HRSG are based on target setpoints and/or conditions at one or more steam turbines such that the steam produced by the HRSG as a result of the predicted setpoints has qualities (e.g., pressure) that substantially match the conditions at the steam turbines. In the example method 300, the setpoints predicted using the MPC logic can be provided as control signals to one or more controllers associated with the gas turbine and the HRSG or, in some examples, as position commands to one or more control valves (e.g., the bypass valves 158, 162 of FIG. 1) for regulating, for example, steam pressure.

Although the predicted setpoints may achieve or substantially achieve one or more of the target setpoints, in operation, the predicted setpoints could cause an increase in an amount of bypass steam generated by the HRSG. For example, if the predicted load setpoint for the gas turbine results in the gas turbine producing an increased amount of exhaust gas relative to current operation conditions, there may be an increase in the amount of steam generated by the HRSG. If the qualities of the steam such as pressure or temperature do not substantially match steam conditions at the steam turbine, one or more bypass valves (e.g., the bypass valves 158, 162 of FIG. 1) may open such that the steam follows a bypass flow path (e.g., the first and second bypass flow paths 156, 164 of FIG. 1) rather than being delivered to the steam turbine.

To minimize the amount of bypass steam generated by the HRSG, the example method 300 includes determining whether an amount of bypass steam generated as a result of the predicted setpoints exceeds a threshold (block 314). Although a certain amount of bypass steam provides a cooling mechanism for the HRSG to prevent overheating, too much bypass steam results in efficiency losses for the combined cycle process plant, as the bypass steam is not provided to the steam turbine. In some examples, the controller 202 determines if the predicted setpoints result in an amount of bypass steam that exceeds, for example, a power generation efficiency threshold or a bypass steam emission threshold based on predetermined threshold inputs and/or empirical data.

If the predicted setpoints result in an amount of bypass steam that exceeds the threshold, the example method 300 includes adjusting the predicted setpoints (block 316). Adjusting the predicted setpoints can include, for example, reducing the gas turbine load setpoint to reduce an amount of exhaust gas. As another example, adjusting the predicted setpoints can include increasing a temperature setpoint for the HRSG such that the temperature of the steam produced by the HRSG substantially matches a temperature of the steam at the steam turbine header to allow for blending of the steam and, thus, a reduction in the amount of bypass steam. The example method 300 also includes dynamically tuning the model control logic based on the adjustment to the predicted setpoints (block 318). Tuning the model control logic can include adjusting or revising one or more of the process constraints, weighting factors, or models used to determine the setpoint such that future implementations of the example method 300 optimally predict the setpoints while producing a minimal amount of bypass steam. In some examples, the decision support tuner 244 of FIG. 2 dynamically performs the tuning.

Figure 4:
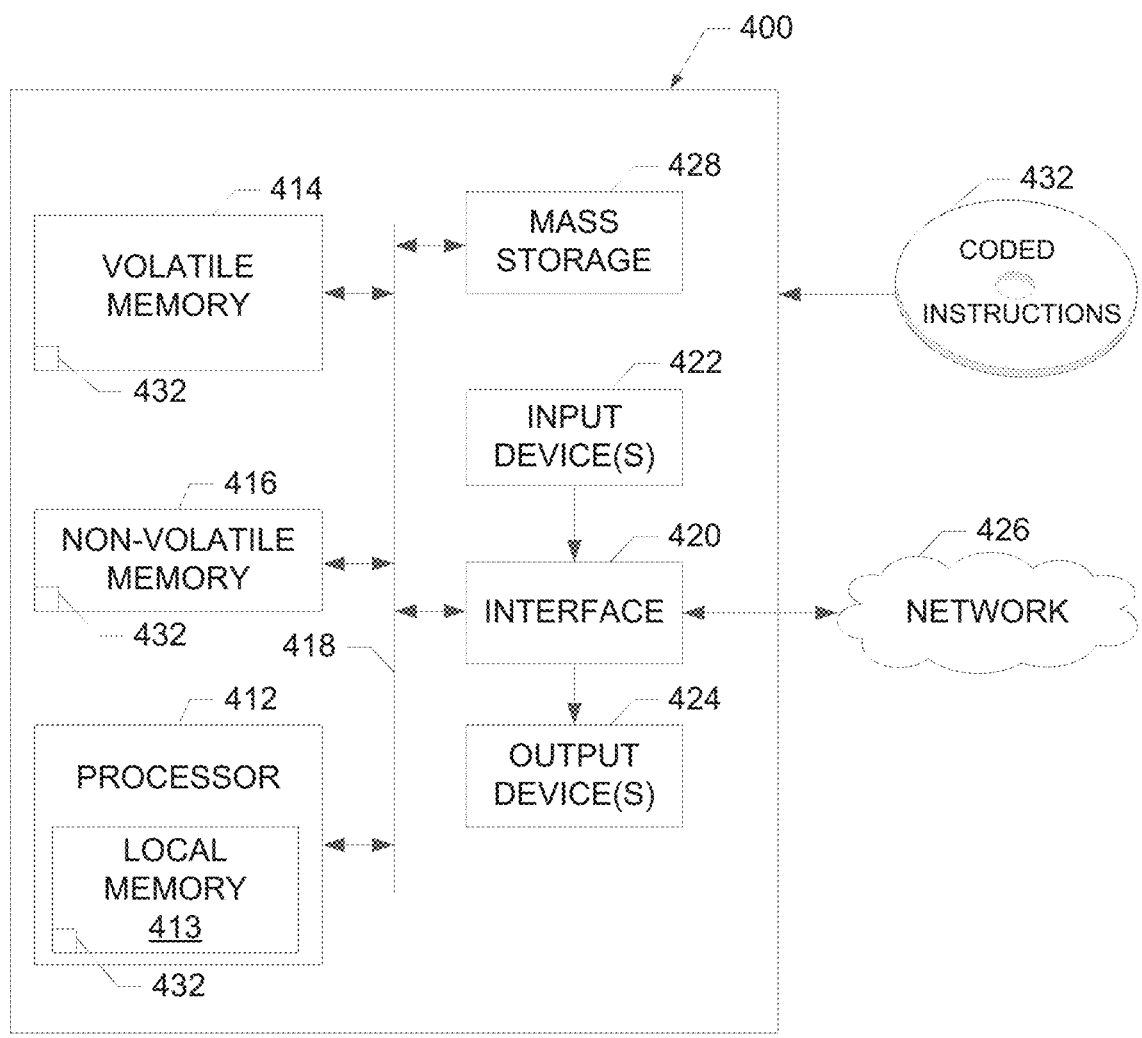
FIG. 4 is a diagram of an example processor platform that may be used to carry out the example method of FIG. 3 and/or, more generally, to implement the example control system of FIG. 2.

FIG. 4 is a block diagram of an example processor platform 400 capable of executing instructions to implement the method of FIG. 3 and the example control system 200 of FIG. 2. The processor platform 400 can be, for example, a server, a personal computer, a mobile device (e.g., a cell phone, a smart phone, a tablet such as an iPad™), a personal digital assistant (PDA), an Internet appliance, or any other type of computing device.

The processor platform 400 of the illustrated example includes a processor 412. The processor 412 of the illustrated example is hardware. For example, the processor 412 can be implemented by one or more integrated circuits, logic circuits, microprocessors or controllers from any desired family or manufacturer.

The processor 412 of the illustrated example includes a local memory 413 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), and/or a PCI express interface.

In the illustrated example, one or more input devices 422 are connected to the interface circuit 420. The input device(s) 422 permit(s) a user to enter data and commands into the processor 412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 424 are also connected to the interface circuit 420 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 420 of the illustrated example, thus, typically includes a graphics driver card, a graphics driver chip or a graphics driver processor.

The interface circuit 420 of the illustrated example also includes a communication device such as a transmitter, a receiver, a transceiver, a modem and/or network interface card to facilitate exchange of data with external machines (e.g., computing devices of any kind) via a network 426 (e.g., an Ethernet connection, a digital subscriber line (DSL), a telephone line, coaxial cable, a cellular telephone system, etc.).

The processor platform 400 of the illustrated example also includes one or more mass storage devices 428 for storing software and/or data. Examples of such mass storage devices 428 include floppy disk drives, hard drive disks, compact disk drives, Blu-ray disk drives, RAID systems, and digital versatile disk (DVD) drives.

Coded instructions 432 to implement the method of FIG. 3 may be stored in the mass storage device 428, in the volatile memory 414, in the non-volatile memory 416, and/or on a removable tangible computer readable storage medium such as a CD or DVD.

From the foregoing, it will be appreciated that the above disclosed apparatus, methods, and systems determine ramp setpoints for generating a load via a gas turbine and producing steam via a heat recovery steam generator (HRSG) having qualities that allow for blending of the steam with steam at a steam turbine header in a combined cycle power plant. The disclosed examples use model predictive control logic to predict operational responses of the gas turbine, the HRSG, and control valves with respect to generating a load via the gas turbine and providing steam to the steam turbine to further generate power. The model predictive control logic accounts for multiple inputs, variables, process constraints, and weighting factors to determine optimal ramp setpoints that minimize an amount of bypass steam generated. In minimizing the amount of bypass steam, the disclosed examples reduce efficiency losses from waste heat in the combined cycle power plant.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
predicting a first setpoint for a gas turbine in a combined cycle power plant for a prediction period based on a process constraint for the gas turbine and a first prediction model;
modifying a second prediction model based on an operating condition at a steam generator to generate a modified second prediction model;
predicting a second setpoint for the steam generator for the prediction period based on a process constraint for the steam generator and the modified second prediction model;
measuring a first steam property of steam generated by the steam generator in the combined cycle power plant based on the second setpoint;
comparing the first steam property to a corresponding second steam property of steam associated with a steam turbine in the combined cycle power plant; and
dynamically adjusting at least one of the first setpoint or the second setpoint based on the comparison.

2. The method of claim 1, wherein the first steam property is one of a steam pressure value, a steam temperature value, or a steam enthalpy value.

3. The method of claim 1, wherein the first setpoint is one of a load setpoint or an exhaust gas temperature setpoint.

4. The method of claim 1, further including:
identifying a difference between the first steam property and the second steam property; and
dynamically adjusting the at least one of the first setpoint or the second setpoint based on the difference.

5. The method of claim 1, further including predicting the second setpoint based on a target setpoint for the steam generator.

6. The method of claim 5, wherein the target setpoint is based on the second steam property of the steam associated with the steam turbine.

7. The method of claim 2, wherein the first steam property is the steam pressure value and the second setpoint is a pressure setpoint.

8. The method of claim 3, wherein the first setpoint is the load setpoint and wherein predicting the first setpoint is based on a maximum ramp rate for the gas turbine.

9. The method of claim 3, wherein the first setpoint is the load setpoint and wherein the adjusting includes reducing the load setpoint.

10. The method of claim 1, wherein predicting the second setpoint is based on the second steam property of the steam associated with the steam turbine or a third steam property of the steam associated with the steam turbine.

11. The method of claim 1, wherein the second steam property includes a steam pressure value at a header of the steam turbine.

12. The method of claim 1, wherein adjusting includes adjusting the first setpoint based on a target time for transitioning the gas turbine from a non-operating state to an operating state.

13. The method of claim 1, wherein predicting the first setpoint is based on an operating condition of the gas turbine.

14. A method comprising:
predicting a first setpoint for a gas turbine in a combined cycle power plant for a prediction period;
predicting a second setpoint for a steam generator during for the prediction period, wherein the second setpoint is to be predicted for a first pressure level section of the steam generator;
measuring a first steam property of steam generated by the steam generator in the combined cycle power plant based on the second setpoint;
comparing the first steam property to a corresponding second steam property of steam associated with a steam turbine in the combined cycle power plant; and
dynamically adjusting at least one of the first setpoint or the second setpoint based on the comparison;
predicting a third setpoint for a second pressure level section of the steam generator;
measuring a third steam property of steam generated at the second pressure level section;
comparing the third steam property to a corresponding fourth steam property of steam associated with a second steam turbine in the combined cycle power plant; and
dynamically adjusting at least one of the first setpoint, the second setpoint, or the third setpoint based on the comparison of the third steam property to the fourth steam property.

* * * * *